United States Patent [19]

Tsang et al.

[11] 4,268,234

[45] May 19, 1981

[54] TIRE CURING ASSEMBLY WITH IMPROVED SEAL

[75] Inventors: David L. Tsang, Cobourg; Wlodzimierz I. Majewicz, Toronto, both of Canada

[73] Assignee: United Tire & Rubber Co. Limited, Rexdale, Canada

[21] Appl. No.: 147,250

[22] Filed: May 6, 1980

[51] Int. Cl.³ .............................................. B29H 5/02
[52] U.S. Cl. ....................................... 425/32; 425/28 P
[58] Field of Search ........................ 425/17, 18, 19, 20, 425/21, 22, 23, 24, 25, 26, 27, 28, 29, 30, 31, 32, 33, 34, 35, 36, 37, 38, 39, 40, 41, 42, 43, 44, 45, 46, 47, 48, 49

[56] References Cited

U.S. PATENT DOCUMENTS

| | | | |
|---|---|---|---|
| 1,916,422 | 7/1933 | Heston | 425/32 |
| 3,029,469 | 4/1962 | Moore et al. | 425/33 |

Primary Examiner—J. Howard Flint, Jr.
Attorney, Agent, or Firm—Fetherstonhaugh & Co.

[57] ABSTRACT

An improved seal is provided in a tire curing press by means of a flexible seal member which is retained as an interface between the base and the cover. The seal member has a flexible body and is arranged to form a pressure chamber which is inflatable in response to an increase in pressure in the tire curing chamber so as to be driven into sealing engagement at the interface.

13 Claims, 7 Drawing Figures

TIRE CURING ASSEMBLY WITH IMPROVED SEAL

FIELD OF INVENTION

This invention relates to tire curing presses. In particular, this invention relates to improvements in the seal formed between the base and cover of a tire curing press.

PRIOR ART

Considerable difficulty has been experienced in attempting to provide a simple and efficient seal between the base and cover of a tire press. In use, the lower half of a tire mold is mounted on the base of the press, a green tire is located in the mold and the upper portion of the mold is positioned on top of the lower portion with the tire located in the molding chamber formed therebetween. The cover of the press is then lowered to bear against the upper mold and the cover is secured to the base in this position. Thereafter steam is admitted to the curing chamber to cure the tire. It is important to ensure that the mold is properly closed in order to avoid flashing. However, because it is not possible to observe the closing of the mold, considerable difficulty is experienced in ensuring that the mold has closed before the cover is seated on the base.

The present invention overcomes the difficulties of the prior art described above by providing an improved seal between the base and the cover which will serve to ensure that the mold segments may be completely closed before the cover is seated on the base.

SUMMARY OF INVENTION

According to one aspect of the present invention, there is provided a tire curing press which comprises a tire curing chamber formed by housing members which include a base member and a cover member. The base and cover members have oppositely disposed sealing faces extending about a perimeter of the curing chamber. A seal member is provided which has an outer peripheral edge and an inner peripheral edge and a flexible body extending in a convex arc of curvature therebetween. A first seal retaining wall is located on one of the housing members and is disposed outwardly from the outer peripheral edge of the seal member for retaining the seal member against displacement outwardly from the curing chamber. A second seal retaining wall is provided on the other of the housing members and is arranged to extend laterally across the flexible body of the seal member when the cover is operably mounted on the base. Passages communicate between the pressure chamber of the seal member and the tire curing chamber to permit the pressure generated within the tire chamber in use to generate a pressure within the pressure chamber which urges the seal member into engagement with the first and second retaining walls, thereby to seal the curing chamber.

According to a further aspect of the present invention, there is provided a tire curing assembly which consists of a base member and a cover member which cooperate to form a tire curing chamber and a tire mold which includes a lower mold segment and an upper mold segment which cooperate to provide a mold cavity therebetween, the tire mold having a predetermined shut height when in the closed position. The base member and the cover member have oppositely disposed sealing faces at their interface extending about the periphery of the curing chamber, the base member having a mold support platform and the cover member having a top wall disposed above said platform. The sealing face of the cover is spaced from the sealing face of the base when the upper wall of the cover bears against the upper mold segment to retain the mold segments in the closed position, thereby to ensure that the mold is fully closed before the cover member is sealed with respect to the base. An inflatable seal is disposed between the sealing faces of the base and cover and has a pressure chamber communicating with the curing chamber, whereby tire curing pressure generated in the tire curing chamber is transmitted to the pressure chamber to inflate the seal into sealing engagement with the sealing faces in use.

PREFERRED EMBODIMENT

The invention will be more clearly understood after reference to the following detailed specification read in conjunction with the drawings, wherein.

Figure 1:
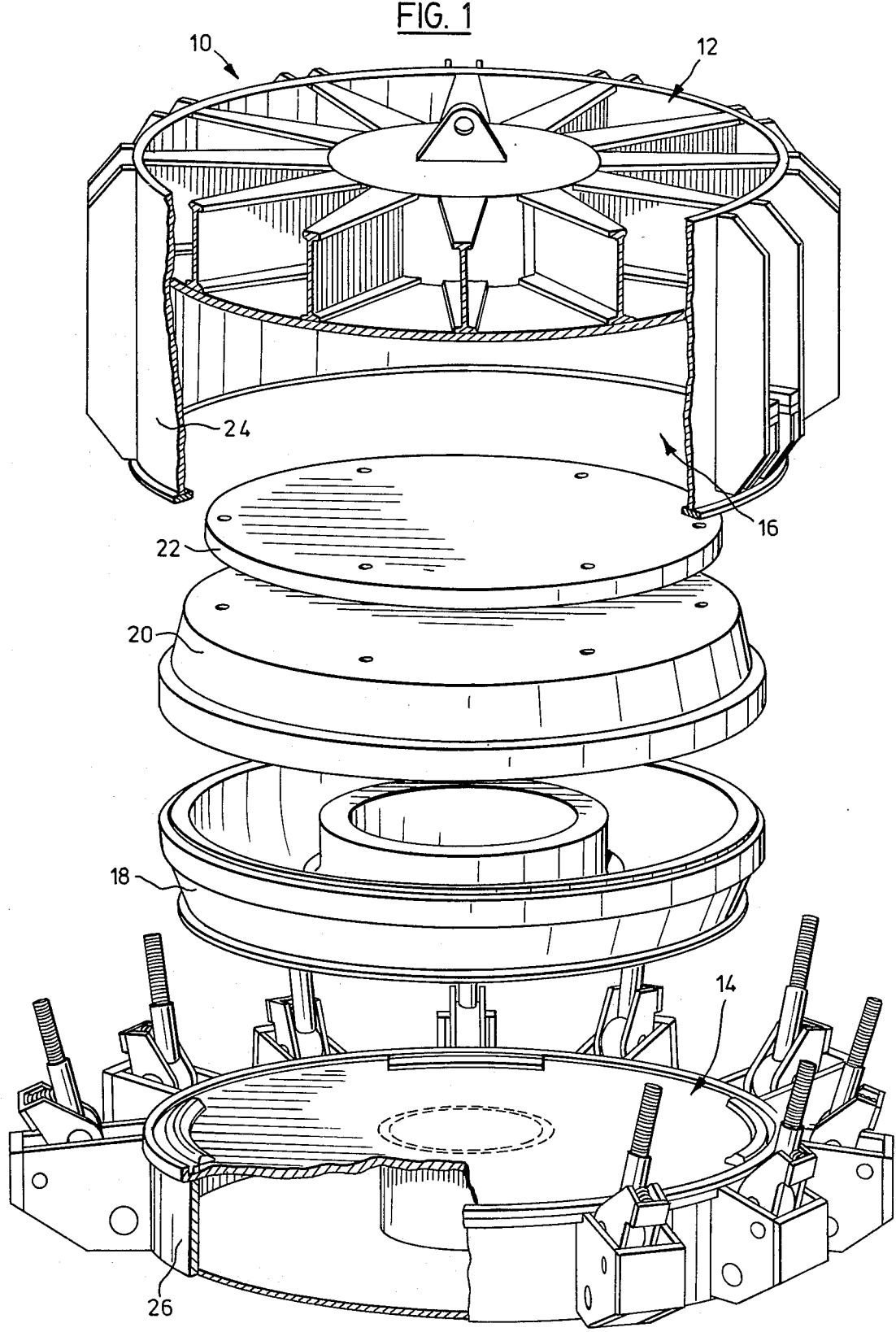
FIG. 1 is a partially sectioned exploded view of a tire press constructed in accordance with an embodiment of the present invention.

With reference to FIG. 1 of the drawings, the reference numeral 10 refers generally to a tire curing assembly constructed in accordance with an embodiment of the present invention. The assembly includes a cover 12, a base 14, an upper tire mold segment 16, a lower tire mold segment 18, and a spacer plate 20. The base 14 has a mold support platform 22. The cover 12 has a top wall 24 and a cylindrical side wall 26 which cooperate with the platform 22 to form a tire curing chamber therebetween in use. The platform 22 has an outer sealing wall 26 and an inner sealing wall 28 which project upwardly therefrom and define a sealing channel 30 which extends about the perimeter of the platform 22. The side wall 26 of the cover 12 has an upper sealing wall 32 arranged in proportion to be aligned with the channel 30 when the cover and base are closed to form the tire curing chamber. A sealing ring 34 is provided which has an outer peripheral edge 36 and an inner peripheral edge 38 and a flexible body 40 extending in a convex arc of curvature between the outer and inner peripheral edges 36 and 38. The seal 34 is proportioned so as to fit within the channel 30. A plurality of notches 42 are formed at spaced intervals about the inner peripheral edge 38.

Figure 2:
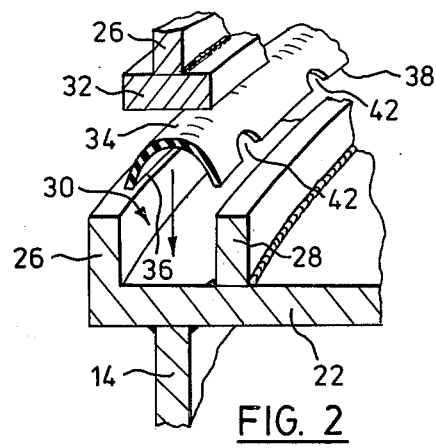
FIG. 2 is a pictorial view of a section of an exploded seal in accordance with one embodiment of the present invention.
Figure 3:
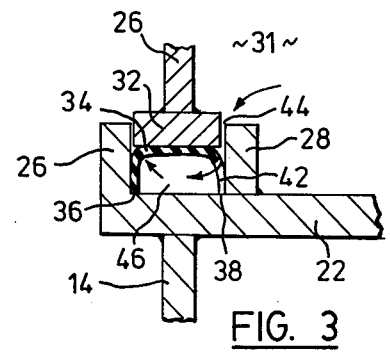
FIG. 3 is an end view showing the seal elements of FIG. 2 in sealing engagement.

As shown in FIG. 2 and FIG. 3 of the drawings, the seal 34 is proportioned to fit in a close fitting relationship within the channel 30. In this embodiment the seal wall 32 of the cover is proportioned to fit freely between the side walls 26 and 28 so that a gap 44 is formed between the side wall 28 and the seal 32. Pressurized atmosphere from within the tire curing chamber 31 enters the pressure chamber 46 which is formed below the seal 34 through the gap 44 and the notches 42 and serves to extend the flexible body of the seal 34 into sealing engagement with the outer sealing wall 26 and the upper sealing wall 32. It will be noted that because a gap 44 is desirable, it is not necessary to achieve a close sealing fit between the cover and the base.

There is an advantage to be derived from proportioning the sealing wall 32 to fit between the sealing walls 26 and 28 in that it provides for a positive location of the cover with respect to the base of the tire curing assembly.

Figure 4:
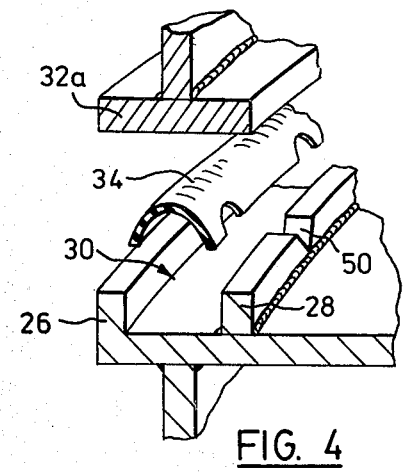
FIG. 4 is a pictorial view of a section of an exploded seal according to a second embodiment of the present invention.
Figure 5:
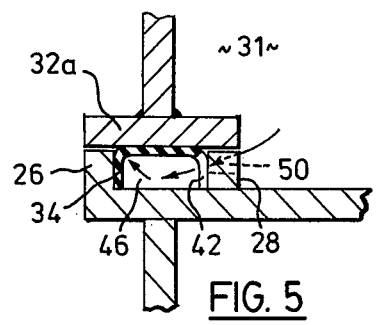
FIG. 5 is a sectional end view of the seal elements of FIG. 4 located in an operative position.

In the embodiment illustrated in FIGS. 4 and 5 of the drawings, the sealing plate 32a is wider than the channel 30 so that it overlies the upper edges of the outer sealing wall 26 and inner sealing wall 28. A plurality of notches 50 are formed at spaced intervals about the periphery of the inner wall 28 so that atmosphere from within the tire curing chamber 21 may enter the pressure chamber 46 through the notches 50 and the notches 42 which are preferably aligned or substantially aligned with one another. There is advantage to extending the plate 32a so that it overlies the side walls 26 and 28 in that it simplifies the alignment of the cover with respect to the base while avoiding the need to locate the sealing wall 32a within the seal channel 46. Furthermore, during the positioning of the cover on the base, the seal 34 is not likely to be pinched between the cover and the base.

Figure 6:
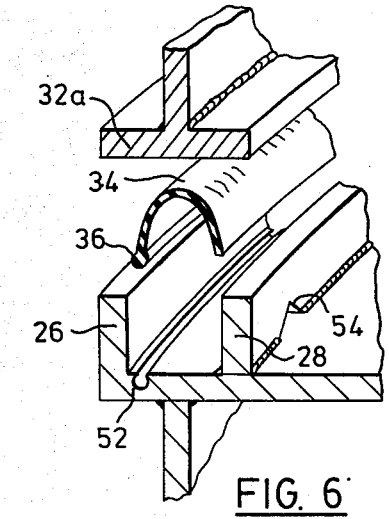
FIG. 6 is a pictorial view of a section of an exploded seal in accordance with a third embodiment of the present invention.
Figure 7:
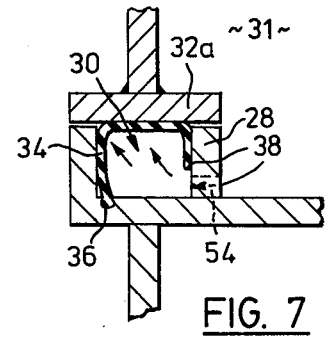
FIG. 7 is a sectional end view of the seal elements of FIG. 6 located in an operative configuration.

FIGS. 6 and 7 illustrate a further embodiment of the present invention wherein the outer peripheral edge 36 of the seal 34 has an enlarged lip portion and a complementary recess 52 is formed in the bottom wall of the channel 30. The enlarged lip is proportioned to fit within the recess 52 to lock the peripheral edge 36 in a fixed position. Vent passages 54 extend between the chamber 31 and the pressure chamber 30 at a level below the level of the inner peripheral edge 38 of the seal. In use, pressurized atmosphere within the tire curing chamber 31 enters the pressure chamber 30 by way of the vent passages 54 and the seal 34 is freed to expand into engagement with the sealing wall 32a of the cover by reason of the fact that the inner peripheral edge 38 of the seal 34 is freed to move relative to the inner sealing wall 28.

It will be noted that the sealing wall 32 is spaced from the platform 22 in the embodiment illustrated in FIG. 3 and the sealing walls 32a are spaced from the upper edges of the sealing walls 26 and 28 in the embodiments illustrated in FIGS. 5 and 7 of the drawings. FIGS. 3, 5 and 7 illustrate the relative positions of the cover and base when the tire mold segments are clamped in the closed position between the platform 22 and the upper wall 24 to an extent sufficient to prevent flashing. Thus it will be seen that the tire mold segments are sealed in a closed position while the cover is supported in a spaced relationship with respect to the base.

Any convenient form of clamping mechanism may be employed for the purposes of clamping the cover with respect to the base, with one such clamping mechanism being generally identified by the reference numeral 60.

From the foregoing it will be apparent that the present invention provides a simple and efficient seal structure in a tire curing press which serves to ensure that the tire curing molds are properly closed when the cover is operably located on the base.

We claim:

1. A tire curing press comprising,
  (a) a tire curing chamber formed by housing members which comprise a base member and a cover member, said base and cover members having oppositely disposed sealing faces extending about a perimeter of said chamber,
  (b) a seal member having an outer peripheral edge and an inner peripheral edge and a flexible body extending in a convex arc of curvature therebetween to define a pressure chamber inwardly thereof,
  (c) seal retaining means comprising,
    (i) a first retaining wall on one of said housing members and disposed outwardly from said outer peripheral edge for retaining said sealing member against displacement outwardly from said chamber,
    (ii) a second retaining wall on the other of said housing members arranged to extend laterally across said flexible body of said sealing member when said cover is operably located on said base to form said chamber,
  (d) passage means communicating between said pressure chamber and said tire curing chamber to permit the pressure which is generated within said curing chamber in use to generate pressure within said pressure chamber which urges said seal member into engagement with said first and second retaining walls, thereby to seal said curing chamber.

2. A tire curing press as claimed in claim 1 wherein said retaining means further comprises a third retaining wall mounted on said one housing member inwardly from said first retaining wall to form a channel shaped recess therebetween, said outer wall serving to engage and retain said inner peripheral edge of said seal against movement inwardly of said chamber.

3. A tire curing press as claimed in claim 1 wherein said retaining means further comprises means in said one housing for engaging said outer peripheral edge of said seal and retaining it against movement relative to said one housing member.

4. A tire curing press as claimed in claim 1, 2 or 3 wherein said passage means comprises a plurality of passages formed in said seal member at spaced intervals along the length thereof.

5. A tire curing press as claimed in claim 1, 2 or 3 wherein said passage means comprises a plurality of passages formed in said inner wall at spaced intervals along the length thereof.

6. A tire curing press as claimed in claim 1, 2 or 3 wherein said passage means comprises a plurality of passages formed in said inner wall and a plurality of passages formed in said inner seal in alignment with said passages of said inner wall.

7. A tire curing press as claimed in claim 2 wherein said second retaining wall is proportioned and arranged to fit between said first and third retaining walls to bear against said seal.

8. A tire curing press as claimed in claim 2 wherein said second retaining wall is proportioned and arranged to overlie and bridge said first and third retaining walls.

9. A tire curing press comprising,
  (a) a tire curing chamber formed by a housing which consists of at least two components having complementary sealing faces adapted to separate along said interface extending about the periphery of said chamber, (b) a channel shaped recess formed on a first of said sealing faces and extending continuously therealong, (c) a seal member mounted in said channel and cooperating with said channel to form a pressure chamber disposed within said channel which when pressurized serves to urge said seal outwardly of said channel, (d) the other of said sealing faces being arranged to overlie the open upper end of said channels so as to restrict the movement of said seal member in a direction outwardly from said channel, thereby to seal the interface, (e) passage means communicating between said pressure chamber and said curing chamber to permit the passage of pressurized atmosphere from within the curing chamber to the pressure chamber.

10. A tire curing press as claimed in claim 2 wherein said channel shaped recess has an outer wall, an inner wall and a bottom wall, said seal member having an outer peripheral edge, an inner peripheral edge and a flexible body extending in a convex arc of curvature between said inner peripheral edge and said outer peripheral edge, said pressure chamber being formed between said bottom wall and said flexible body and said inner peripheral edge of said seal being movable relative to said inner wall of said channel to permit expansion of said pressure chamber by movement of said flexible body relative to the walls of said channel.

11. A tire curing press as claimed in claim 10 wherein said passage means comprises a plurality of passages formed in said seal at spaced intervals along the length thereof.

12. A tire curing press as claimed in claim 10 wherein said passage means comprises a plurality of passages formed in said inner wall at spaced intervals along the length thereof.

13. A tire curing assembly comprising,
  (a) a tire curing chamber formed by housing members which comprise a base member and a cover member, said base and cover members having oppositely disposed sealing faces at an interface extending about the periphery of said curing chamber,
  (b) said base member having a mold support platform and said cover member having a top wall disposed above said platform,
  (c) a tire mold in said tire curing chamber comprising a lower mold segment and an upper mold segment which when closed define a mold cavity, said mold having a predetermined shut height when in said closed position,
  (d) said sealing face of said cover being spaced from said sealing face of said base when said upper wall of said cover bears against said upper mold segment to retain said mold segment in said closed position, thereby to ensure that said mold is fully closed before said cover member is sealed with respect to said base,
  (e) inflatable sealing means disposed between said sealing faces of said base and cover, said inflatable sealing means having a pressure chamber communicating with said curing chamber whereby tire curing pressure generated in said tire curing chamber is transmitted to said pressure chamber to inflate said sealing means into sealing engagement with said sealing faces.

* * * * *